United States Patent
Truschin et al.

(10) Patent No.: US 8,850,456 B2
(45) Date of Patent: Sep. 30, 2014

(54) EXTENDED DYNAMIC OPTIMIZATION OF CONNECTION ESTABLISHMENT AND MESSAGE PROGRESS PROCESSING IN A MULTI-FABRIC MESSAGE PASSING INTERFACE IMPLEMENTATION

(75) Inventors: Vladimir D. Truschin, Sarov (RU); Alexander V. Supalov, Erftstadt (DE); Alexey V. Ryzhykh, Sarov (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/453,486

(22) Filed: Apr. 23, 2012

(65) Prior Publication Data
US 2012/0210324 A1 Aug. 16, 2012

Related U.S. Application Data

(63) Continuation of application No. 12/080,688, filed on Apr. 4, 2008, now Pat. No. 8,245,240.

(51) Int. Cl.
*G06F 9/44* (2006.01)
*G06F 9/54* (2006.01)
*G06F 17/00* (2006.01)

(52) U.S. Cl.
CPC ............................. *G06F 9/546* (2013.01)
USPC ............................ 719/314; 709/212

(58) Field of Classification Search
None
See application file for complete search history.

(56) References Cited

U.S. PATENT DOCUMENTS

| | | | |
|---|---|---|---|
| 6,304,986 B1 | 10/2001 | Ma et al. | |
| 6,834,193 B1 | 12/2004 | Linderborg et al. | |
| 2002/0021774 A1 | 2/2002 | Callaghan et al. | |
| 2003/0016808 A1 | 1/2003 | Hu et al. | |
| 2003/0050990 A1 | 3/2003 | Craddock et al. | |
| 2003/0126321 A1* | 7/2003 | Sinha | 710/38 |
| 2006/0146715 A1 | 7/2006 | Supalov | |
| 2007/0097952 A1 | 5/2007 | Truschin et al. | |
| 2007/0276973 A1 | 11/2007 | Tan et al. | |
| 2008/0077916 A1 | 3/2008 | Supalov et al. | |
| 2008/0235409 A1 | 9/2008 | Ryzhykh | |
| 2009/0063444 A1* | 3/2009 | Arimilli et al. | 707/5 |

OTHER PUBLICATIONS

Peter Arijs, et al. "Architecture and Design of Optical Channel Protected Ring Networks", Jan. 1, 2001.*
Intel, "Intel Cluster Toolkit 3.0.1 Tutorial," May 16, 2007, pp. 1-136.

* cited by examiner

*Primary Examiner* — Lechi Truong
*Assistant Examiner* — Abdou Seye
(74) *Attorney, Agent, or Firm* — Trop, Pruner & Hu, P.C.

(57) ABSTRACT

In one embodiment, the present invention includes a system that can optimize message passing by, at least in part, automatically determining a minimum number of fabrics and virtual channels to be activated to handle pending connection requests and data transfer requests, and preventing processing of new connection requests and data transfer requests outside of a predetermined communication pattern. Other embodiments are described and claimed.

12 Claims, 7 Drawing Sheets

EXTENDED DYNAMIC OPTIMIZATION OF CONNECTION ESTABLISHMENT AND MESSAGE PROGRESS PROCESSING IN A MULTI-FABRIC MESSAGE PASSING INTERFACE IMPLEMENTATION

This application is a continuation of U.S. patent application Ser. No. 12/080,688, filed Apr. 4, 2008, now U.S. Pat. No. 8,245,240 the content of which is hereby incorporated by reference.

BACKGROUND

Many computational problems can be subdivided into independent or loosely-dependent tasks, which can be distributed among a group of processors or systems and executed in parallel. This often permits the main problem to be solved faster than would be possible if all the tasks were performed by a single processor or system. Cooperating processors and systems can be coordinated as necessary by transmitting messages between them. Messages can also be used to distribute work and to collect results. Some partitionings or decompositions of problems can place significant demands on a message passing infrastructure, either by sending and receiving a large number of messages, or by transferring large amounts of data within the messages.

Messages may be transferred over a number of different communication channels, or fabrics. For example, processors executing on the same physical machine may be able to communicate efficiently using shared memory, while processors on different machines may communicate through a high-speed network.

To prevent the varying operational requirements of these different communication fabrics from causing extra complexity in message-passing applications, a standard set of message passing functions may be defined to perform the standard functions over each type of fabric. One standard library definition is the Message Passing Interface ("MPI") from the members of the MPI Forum. An MPI library may provide the standard functions over one or more fabrics. However, as the number of fabrics supported by a library increases, the message passing performance tends to decrease.

An issue that occurs in high process count jobs is the necessity to establish and maintain a high number of point-to-point connections between the processes of the parallel job. Dynamic (or lazy) connection establishment is typically used to avoid a massive up-front connection establishment phase by delaying the connection establishment until two processes start to communicate.

However, the potential need for processing a connection request at any time during job execution imposes additional stress on a progress engine: every once in a while, all connections need to be queried, and new connections established, if low-level network timeouts are to be avoided. The overhead associated with connection establishment and querying of a growing number of virtual channels naturally slows down data transfer of the progress engine. This situation is especially pronounced when a posted receive queue includes requests with a MPI_ANY_SOURCE process selector, because this requires all fabrics and virtual channels to be queried.

DETAILED DESCRIPTION

Embodiments may increase low level and application performance of an MPI library through automatic detection and minimization of the number of communication fabrics and virtual channels used, especially for high process count jobs. Such resources can be minimized, even when processing a MPI_ANY_SOURCE process selector, using an embodiment of the present invention. To enable this performance, various global and particular optimizations may be implemented, where the global optimizations can be applied to all communication fabrics and particular optimizations may additionally be applied to certain fabrics such as a remote direct memory access (RDMA) fabric or other such fabric.

Figure 1:
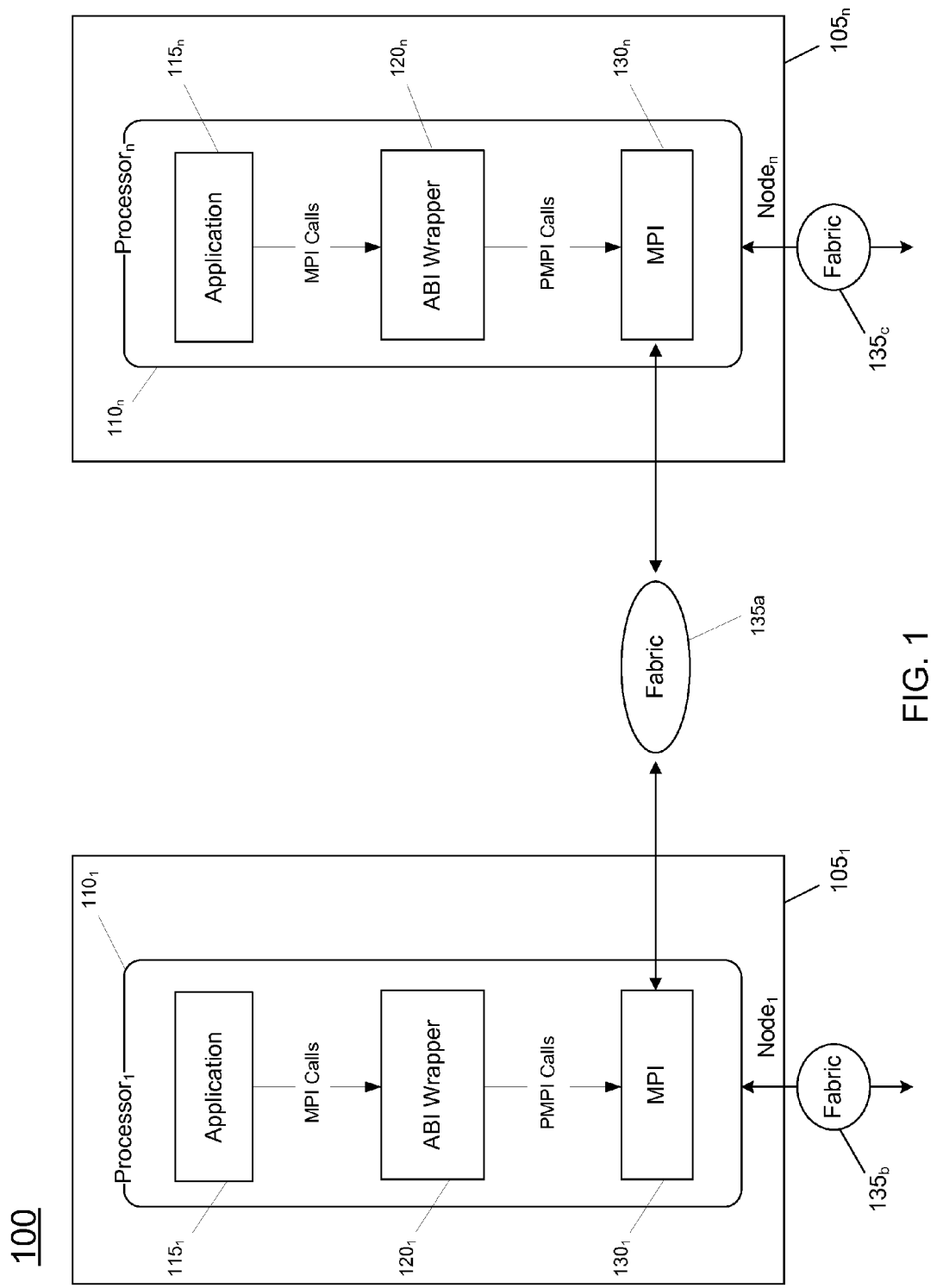
FIG. 1 is a block diagram of a system in accordance with one embodiment of the present invention.

Shown in FIG. 1 is a block diagram of a system in accordance with one embodiment of the present invention. Specifically, system 100 includes a plurality of nodes $105_1$-$105_n$ (generically node 105), each of which may include multiple processors that can execute various processes. As shown in FIG. 1, a plurality of processors $110_1$-$110_n$ (generically processor 110) are shown within the nodes, although for ease of illustration only a single processor is shown in each node. Understand that in various embodiments each processor may be a multicore processor including a plurality of cores, each of which is able to independently execute a different process. Each processor may include a process or application $115_1$-$115_n$ (generically application 115). In some embodiments, the system of FIG. 1 is an exemplary distributed application which is cooperatively implemented via generally contemporaneous execution of machine accessible instructions of multiple processors 110. In particular, a first process (i.e., software application $115_1$) may be executed on first processor $110_1$ and a second process $115_n$, which may be a parallel process, may be executed by second processor $110_n$, which cooperatively realize the example distributed application using any variety of distributed computing algorithms, techniques and/or methods. In the example system of FIG. 1, the example software applications 115 implement different machine accessible instructions. Alternatively, the example software applications may implement similar and/or identical machine accessible instructions.

For simplicity and ease of understanding, the example two node system of FIG. 1 is referenced. However, distributed applications may be implemented by systems incorporating any number and/or variety of nodes and processors. For example, one or more processes of a distributed application may be implemented by a single processor, a single process may be implemented by each processor, etc. Applications 115 may be developed using any variety of programming tools and/or languages and may be used to implement any variety of distributed applications.

Each application 115 may be written and linked to a MPI implementation different than that of an associated MPI library 130 (generally). To enable easy transition to the corresponding native MPI 130, an application binary interface (ABI) wrapper $120_1$-$120_n$ (generically wrapper 130) written to the same MPI implementation as application 115 may intercept MPI calls made by the process 115 to library $130_1$-$130_n$ (generically library 130) of FIG. 1, which facilitates the exchange of, for example, distributed application messages, between applications 115. ABI wrapper 120 thus calls MPI library 130 using profiling MPI (PMPI) calls. In turn, these MPI libraries 130 may perform requested operations for application 115 which may be transmitted via a fabric 135a which, in one embodiment may be a fast interconnect such as a point-to-point (PtP) interconnect, although the scope of the present invention is not limited in this regard. Also, each node 105 may have additional fabrics 135b and 135c (for example). Still further, inter-processor fabrics such as a shared memory connection fabric may be present between processes that are executed on different processors of a single node.

Figure 2:
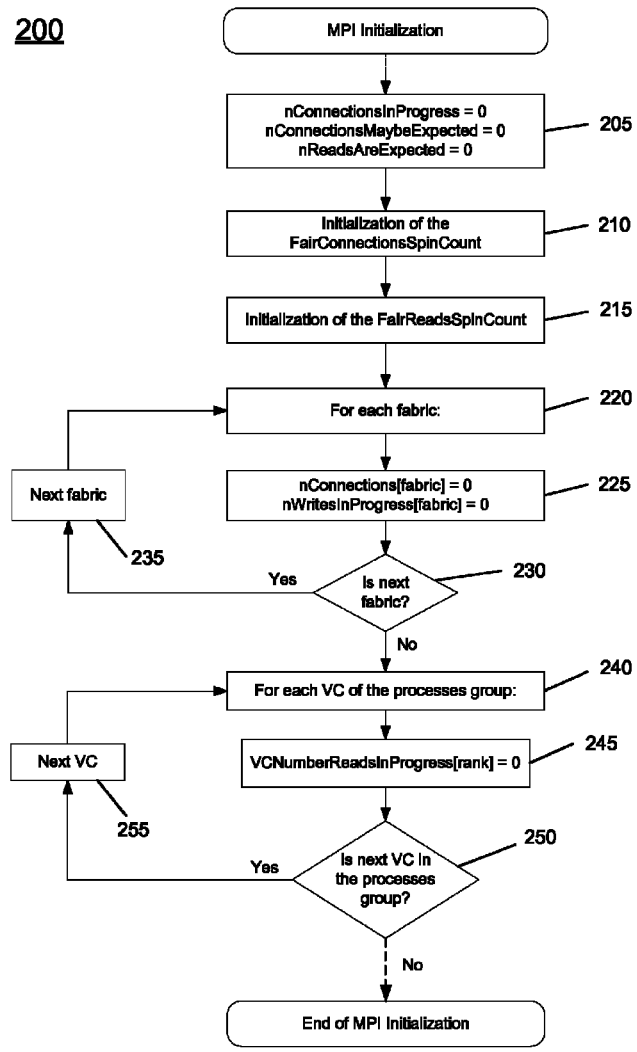
FIG. 2 is a flow diagram of an initialization process in accordance with one embodiment of the present invention.

Before various optimizations such as described herein may be performed, an initialization process may first occur. Referring now to FIG. 2, shown is a flow diagram of an initialization process in accordance with one embodiment of the present invention. As shown in FIG. 2, method 200 may be implemented by an MPI library to perform initialization of different variables that can be used in connection with optimizations such as these described herein. Method 200 may begin at block 205 by setting a number of different variables to a predetermined value, e.g., zero. Specifically as shown in FIG. 2, nConnectionsInProgress, nConnectionsMaybeExpected, and nReadsAreExpected variables all may be set to zero. Each of these variables may be used in connection with various read and write optimizations. Then at block 210, a FairConnectionsSpinCount may be initialized and at block 215, a FairReadsSpinCount may be initialized. These two variables may be associated with a progress engine. More specifically, these spin counts may be used to control updating of variables associated with connection and reads, and thus may be used to control when a connections progress engine or other entity checks for new connection requests or data transfer requests. When set to a relatively high level, these spin counts can prevent processing of new requests outside of an established communications pattern. While the scope of the present invention is not limited in this regard, spin counts of greater than approximately 100-1000 may be used to provide such prevention of stray requests.

Still referring to FIG. 2, at block 220 a loop may begin for each of a plurality of fabrics present in a given system. For each fabric, at block 225 an nConnections[fabric] and an nWritesInProgress[fabric] variable may be set to a predetermined value, e.g., zero, and then at diamond 230 it may be determined whether another fabric is present. If so, control passes to the next fabric (block 235) and control passes back to block 220. Otherwise, control passes to block 240, where another loop may be traversed. Specifically, this loop may be performed for each virtual channel (VC) of a processes loop. At block 245, a VCNumberReadsInProgress[rank] may be set to a predetermined value, e.g., zero. Then it may be determined whether a next VC is present in the processes at diamond 250. If so, control passes to block 255 to move to the next VC. Otherwise, the MPI initialization process may conclude. While shown with this particular implementation in the embodiment of FIG. 2, the scope of the present invention is not limited in this regard.

Figure 3:
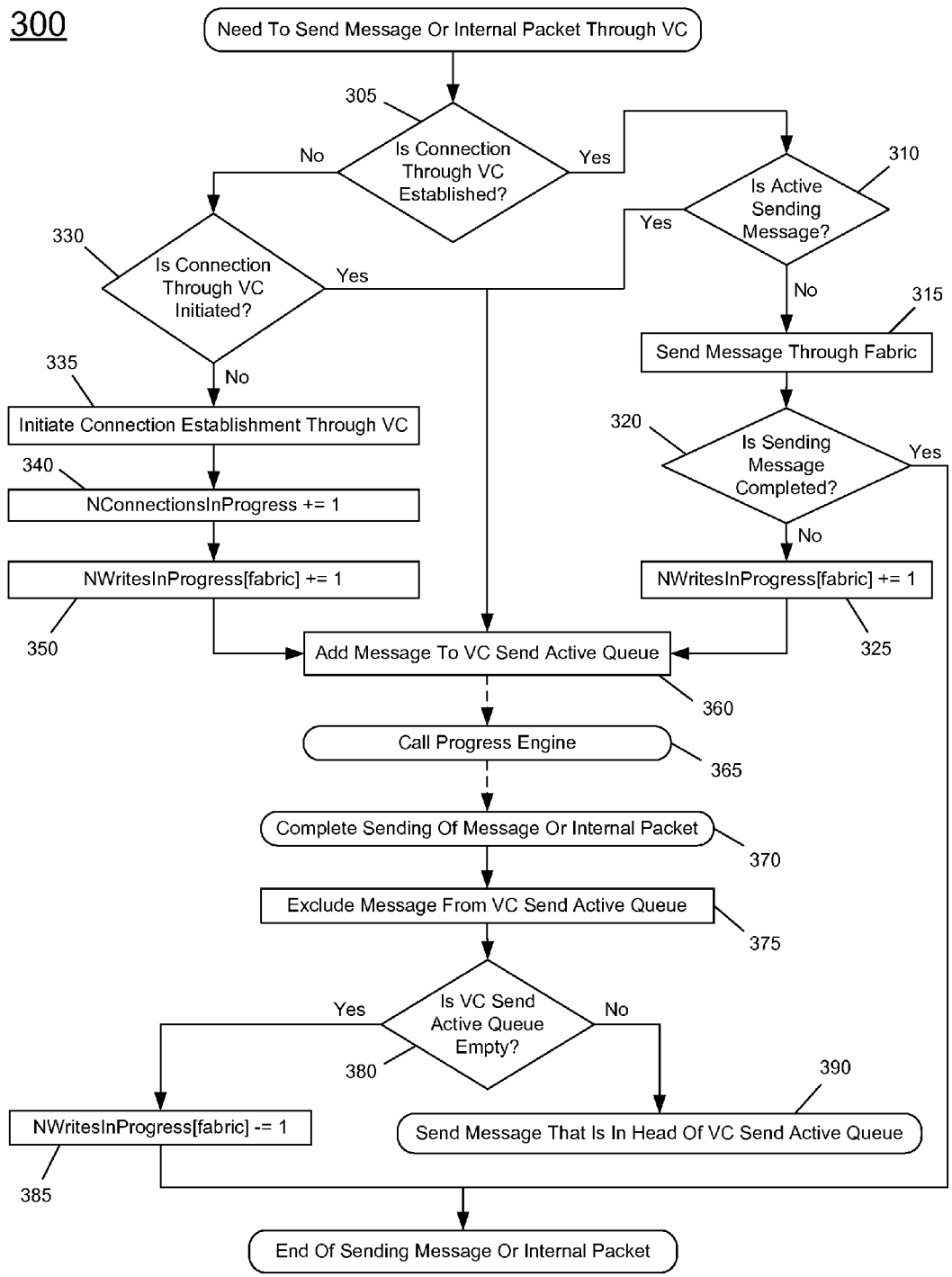
FIG. 3 is a flow diagram that sets forth a method for handling sending of a message or internal packet in accordance with one embodiment of the present invention.

Referring now to FIG. 3, shown is a flow diagram that sets forth a method for handling sending of a message or internal packet through a VC. More specifically, method 300 may be used to optimize such sending. As shown in FIG. 3, method 300 may begin by determining whether a connection through a VC is already established (diamond 305). If so, control passes to diamond 310, where it may be determined whether the VC is active in sending another message. If not, control passes to block 315 where the message may be sent through the fabric. At diamond 320, it may be determined if sending of the message has completed. If so, method 300 may conclude. Otherwise control passes to block 325, where the nWritesInProgress[fabric] variable may be incremented. From both of block 325 and diamond 310, control may pass to block 360, which will be discussed further below.

Referring still to FIG. 3, if instead at diamond 305 it is determined that a connection through the VC has not previously been established, control passes to diamond 330 where it may be determined whether a connection through the VC has been initiated. If so, control passes to block 360, discussed below. Otherwise, control passes to block 335, where initiation of connection establishment may occur through the VC (block 335). Further at blocks 340 and 350, the variables nConnectionsInProgress and nWritesInProgress[fabric] both may be incremented.

Thus control passes to block 360. At block 360, a message may be added to a VC send active queue. At block 365, a progress engine may be called. Further details regarding the progress engine will be discussed below with regard to FIGS. 5-7. After calling the progress engine and returning from operation of the progress engine, the sending of the message or internal packet may be completed (block 370), after which the message may be excluded from the VC send active queue (block 375).

Referring still to FIG. 3, control then may pass to diamond 380 where it may be determined whether the VC send active queue is empty. If so, the variable nWritesInProgress[fabric] may be decremented (block 385). Otherwise, the message that is at the head of the VC send active queue may be sent, at block 390. Thus optimized sending of messages may be realized using an embodiment of the present invention, such as that described with regard to FIG. 3. In this way, if a send operation cannot be effected immediately (e.g., the connection is not yet established or there are other send operations in progress for this fabric), the message is added to the VC send active queue and the nWritesInProgress variable is incremented. The value of this variable is decremented again upon completion of the delayed data transfer operation and elimination of the respective element from the VC Send Active queue, when this queue becomes empty.

Figure 4:
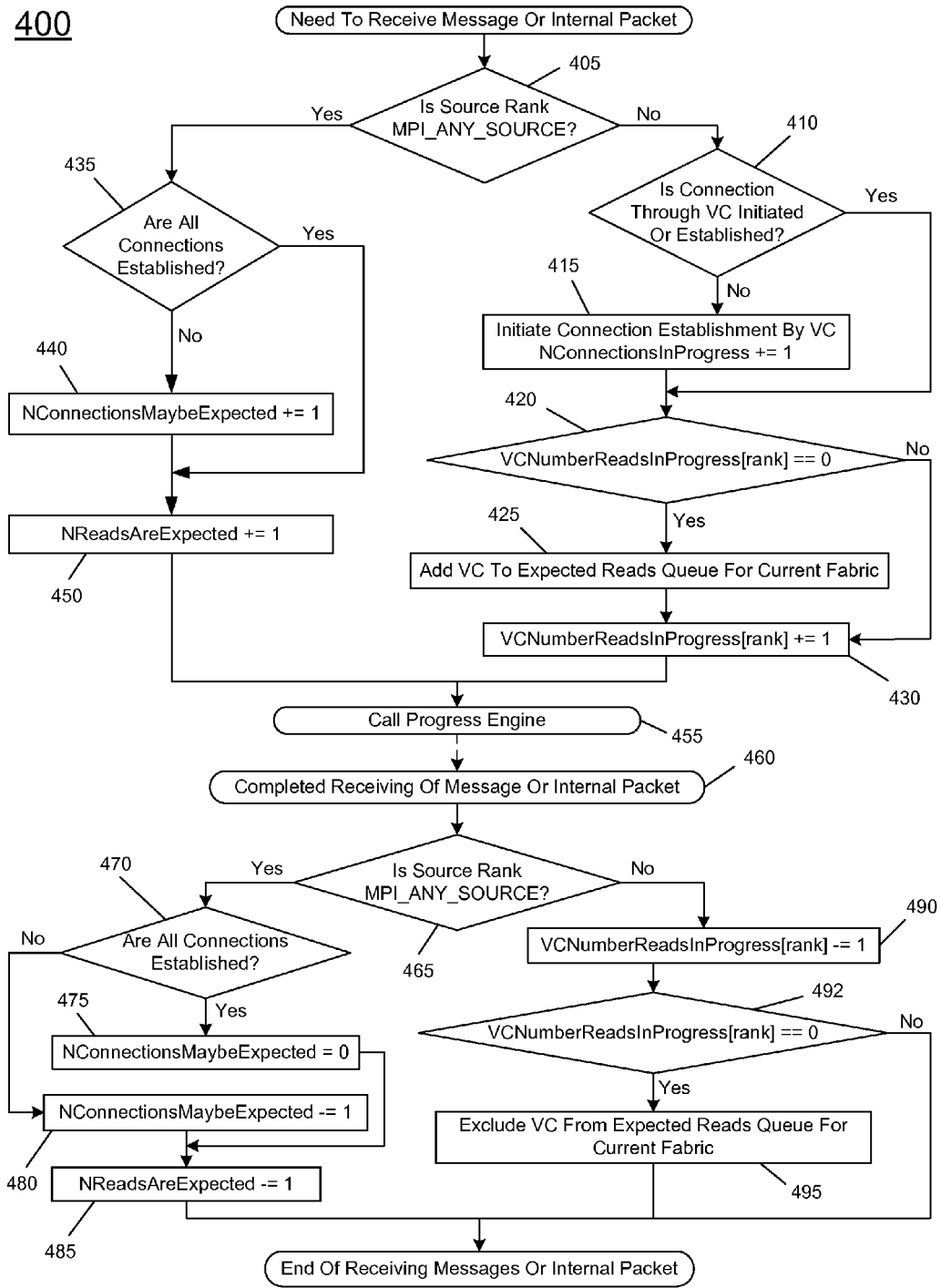
FIG. 4 is a flow diagram for receiving a message or internal packet in accordance with an embodiment of the present invention.

Referring now to FIG. 4, shown is a flow diagram for receiving a message or internal packet in accordance with an embodiment of the present invention. As shown in FIG. 4, method 400 may begin by determining whether a given source rank is a MPI_ANY_SOURCE (diamond 405). If not, control passes to diamond 410, where it may be determined whether a connection through a VC has been initiated or established. If not, such connection establishment may be initiated by the VC and the variable nConnectionsInProgress may be incremented (block 415). At diamond 420, it may be determined whether the variable VCNumberReadsInProgress[rank] is equal to zero. If so, control passes to block 425, where the VC may be added to an expected reads queue for the current fabric. Control then passes to block 430, where the VCNumberReadsInProgress[rank] variable may be incremented.

Referring still to FIG. 4, if instead at diamond 405 it is determined that a source rank is an MPI_ANY_SOURCE, control passes to diamond 435. At diamond 435 it may be determined whether all connections are established. If not, the variable nConnectionsMaybeExpected is incremented (at block 440), and control passes to block 450 where the variable nReadsAreExpected may be incremented.

Control then passes to block 455, where the progress engine may be called to handle message receipt. Control passes to block 460, when the given message or internal packet has been completely received. Next, control passes to diamond 465, where it may be determined whether a given source rank is an MPI_ANY_SOURCE. If so, control passes to block 470. At diamond 470 it may be determined whether all connections are established. If so, the variable nConnectionsMaybeExpected is set to zero, and control passes to block 485. If all connections are not established, the variable nConnectionsMaybeExpected is decremented (at block 480), and control passes to block 485 where the variable nReadsAreExpected may be decremented.

Still referring to FIG. 4, if the source rank is not an MPI_ANY_SOURCE, control passes to block 490, where the variable VCNumberReadsInProgress[rank] may be decremented. At diamond 492, it may be determined whether this variable is equal to zero. If so, the given VC may be excluded from the expected reads queue for a current fabric. From both of diamond 492 and blocks 495 and 485, method 400 may conclude. Thus upon a receive from a process with a definite rank, on a level with possibly additional initialization of the connection data structures, the variable VCNumberReadsInProgress associated with the VC is incremented. Further, for certain fabrics, if the value of the variable VCNumberReadsInProgress becomes equal to one, the respective VC is placed at the end of the queue of expected reads that is associated with the fabric of the corresponding VC. When VCNumberReadsInProgress becomes again equal to zero, the respective VC is eliminated from the queue of expected reads. As further shown in FIG. 4, if the expected sender process is not known (e.g., when the MPI_ANY_SOURCE process selector is used), the variable nReadsAreExpected is incremented as is the variable nConnectionsMaybeExpected, if some connections still need to be established.

Figure 5:
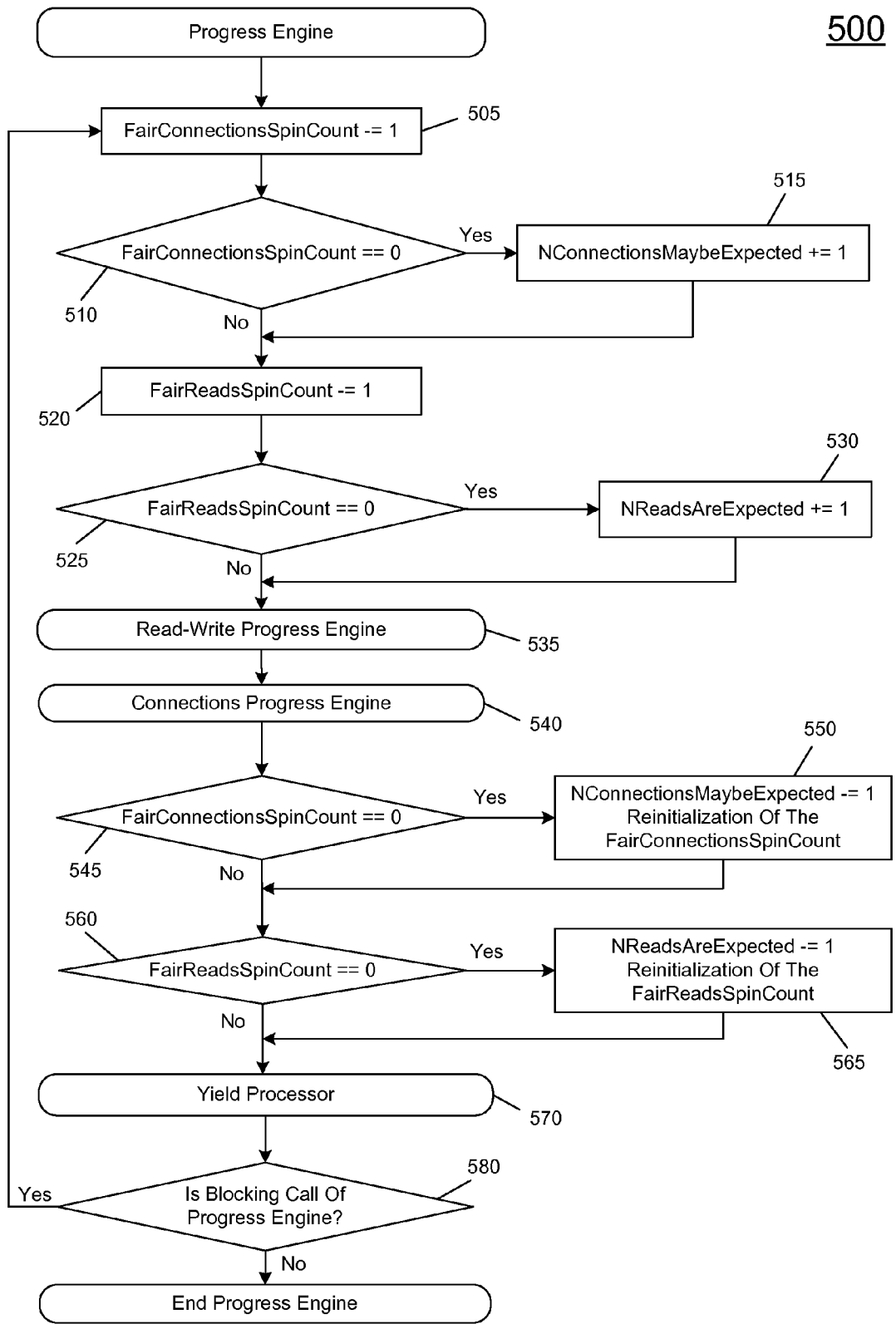
FIG. 5 is a flow diagram of overall operation of a progress engine in accordance with one embodiment of the present invention.

Referring now to FIG. 5, shown is a flow diagram of overall operation of a progress engine in accordance with one embodiment of the present invention. In one embodiment, the progress engine is implemented as a subroutine that performs operations necessary to exchange messages with cooperating processes. In some embodiments, multiple progress engines may be provided (for example, one for each fabric); in other embodiments, the logic operations described may be performed by code whose execution is interleaved with other operations. As shown in FIG. 5, process 500 may correspond to an algorithm for a progress engine in accordance with an embodiment of the present invention. At block 505, a FairConnectionsSpinCount variable is decremented, and at diamond 510 it may be determined whether this count is equal to zero. If so, the variable nConnectionsMaybeExpected is incremented (block 515). From both of diamond 510 and block 515, control passes to block 520, where the FairReadsSpinCount variable may be decremented. Then it may be determined whether this variable is equal to zero at diamond 525. If so, the variable nReadsAreExpected may be incremented at block 530. From both of diamond 525 and block 530, control passes to block 535, where a read-write progress engine may execute, followed by execution of a connections progress engine at block 540. Control then passes to diamond 545, where it may be determined whether the FairConnectionsSpinCount variable is equal to zero. If so, at block 550 the variable nConnectionsMaybeExpected can be decremented and the FairConnectionsSpinCount is re-initialized. From both of diamond 545 and block 550, control passes to diamond 560 to determine whether the FairReadsSpinCount variable is equal to zero. If so, control passes to block 565, where the variable nReadsAreExpected is decremented, and the FairReadsSpinCount variable is re-initialized. From both of diamond 560 and block 565, control passes to block 570, where a yield function may be called to let the processor switch to other processes that may be ready for execution. After such processing, control may pass to diamond 580 where it may be determined whether a blocking call of the progress engine is present. If so, control passes to block 505, discussed above. Otherwise a flow of progress engine may conclude.

Figure 6:
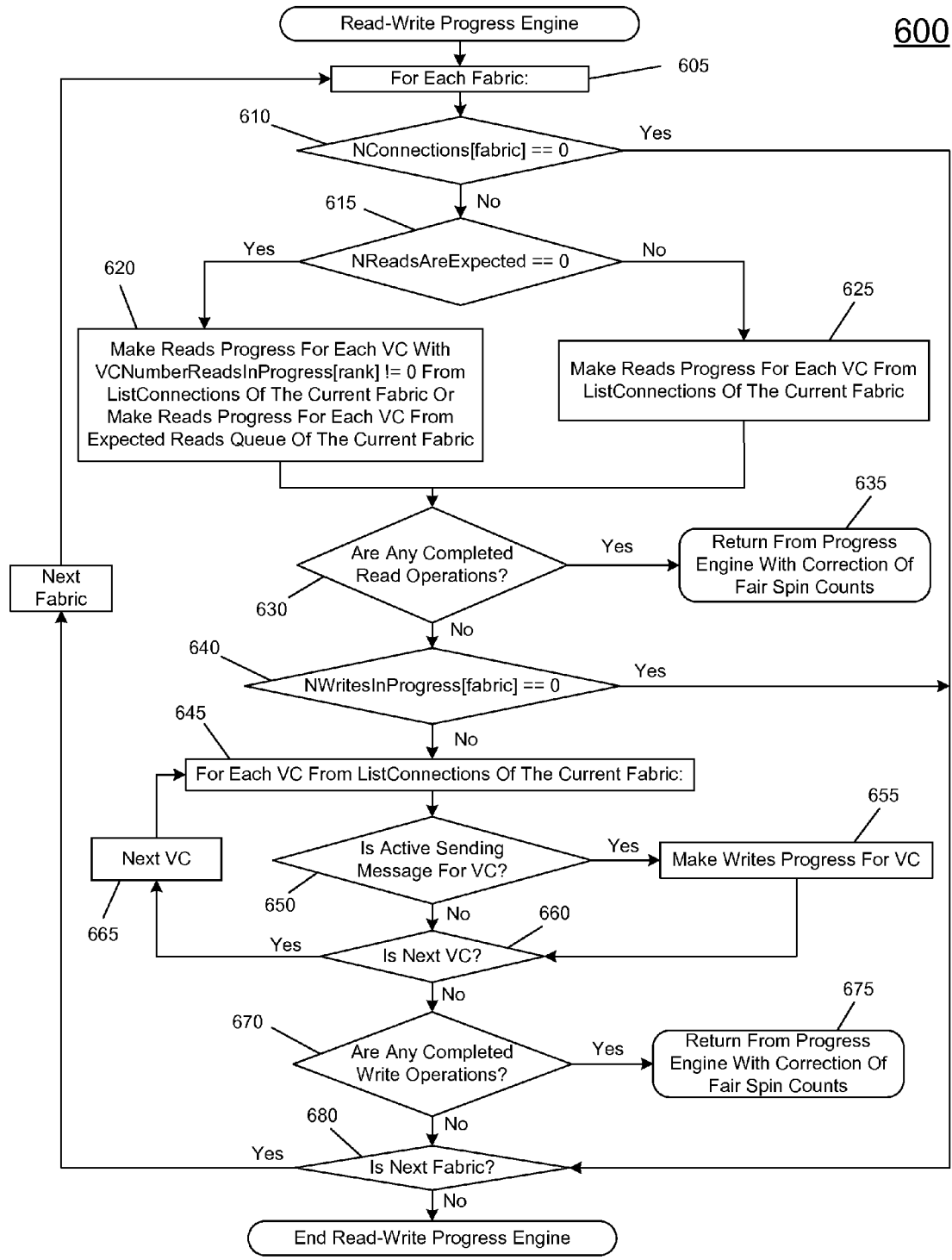
FIG. 6 is an algorithm for a read-write progress engine in accordance with one embodiment of the present invention.

Referring now to FIG. 6, shown is an algorithm for a read-write progress engine in accordance with one embodiment of the present invention. As shown in FIG. 6, a loop may be performed for each fabric present in a system that begins at block 605. Control passes to diamond 610, where it may be determined whether the variable nConnections[fabric] equals zero. If so, no processing is performed in this loop, and control passes to diamond 680 to determine whether another fabric is present. If so, control passes back to block 605. Otherwise the read-write progress engine concludes.

Thus for each fabric present where nConnections[fabric] is not equal to zero, control passes to diamond 615 where it may be determined whether the nReadsAreExpected variable is equal to zero. If so, control passes to block 620, where read progress may be made for each VC having a VCNumberReadsInProgress[rank] variable that does not equal zero, more specifically for each VC from a list of connections of the current fabric. Or, read progress may be made for each VC from the expected reads queue of the current fabric. The choice of the algorithm in this case can depend, for example, on the number of connections already established for the given fabric. If instead the variable nReadsAreExpected does not equal zero, control passes to block 625, where read progress may be made for each VC from the list of connections of the current fabric. Control then passes to diamond 630, where it may be determined whether there are any completed read operations. If so, control may return from the progress engine with a correction of the FairConnectionsSpinCount and FairReadsSpinCount variables (block 635). Otherwise, control passes to diamond 640, where it may be determined whether the variable nWritesInProgress[fabric] equals zero. If so, control passes to diamond 680, discussed above. If not, control passes to block 645, where another loop may be performed for each VC. More specifically, for each VC from the list of connections of the current fabric, it may be determined whether the progress engine is active sending a message for the VC, at diamond 650. If so, write progress for the VC may be made (block 655). From both of blocks 655 and diamond 650, control passes to diamond 660, where it may be determined whether another VC is present. If so, control may pass to the next VC (block 665), and the loop beginning at block 645 may occur for that VC.

When all VCs have been processed, control passes to block 670 where it may be determined whether there are any completed write operations. If so, control may return from the progress engine with a correction of the FairConnectionsSpinCount and FairReadsSpinCount variables (block 675). Otherwise, if no completed write operations have occurred, control passes to diamond 680, discussed above. While shown with this particular implementation in the embodiment of FIG. 6, the scope of the present invention is not limited in this regard.

Figure 7:
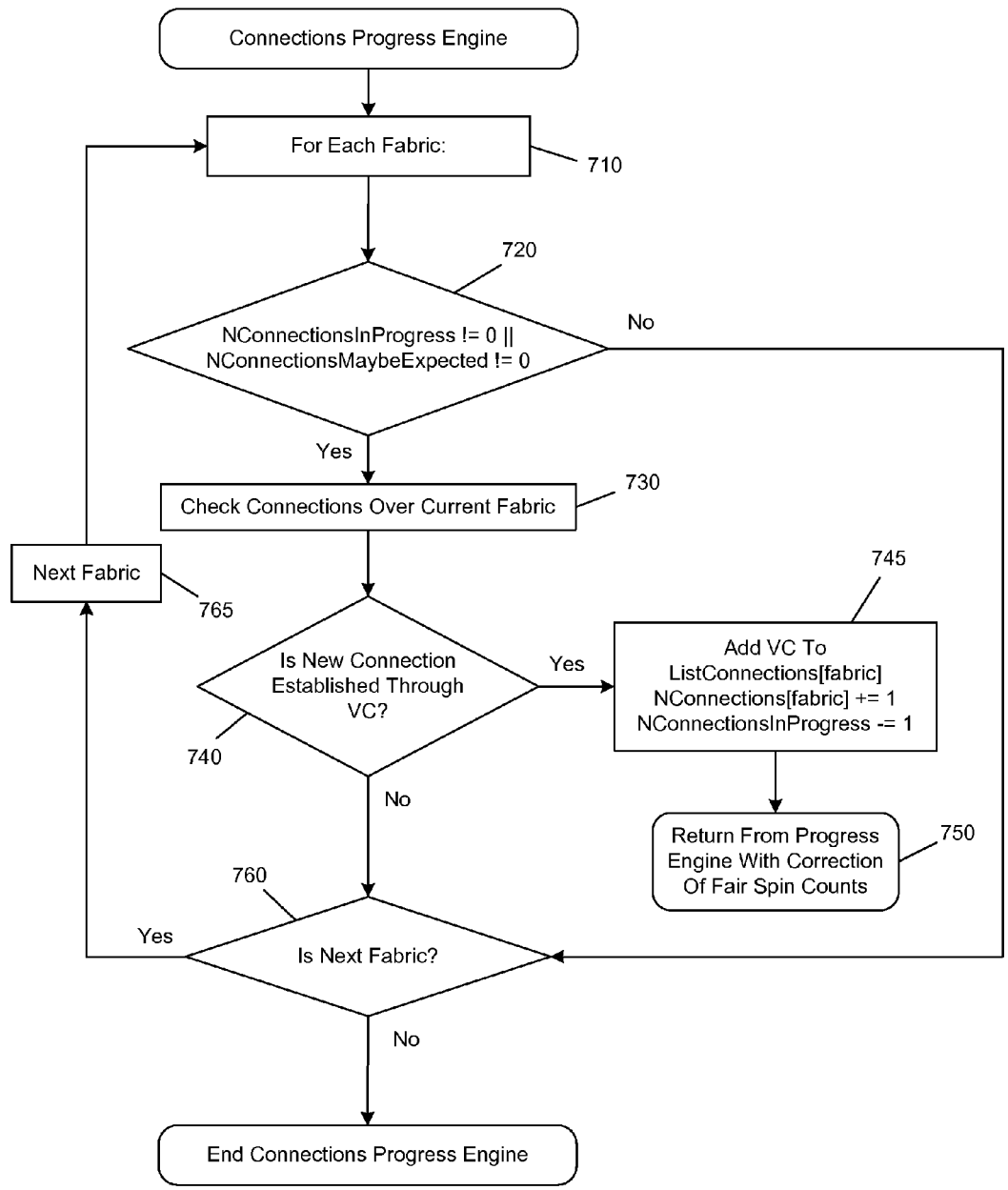
FIG. 7 is a flow diagram of an algorithm for a connection progress engine in accordance with one embodiment of the present invention.

Referring now to FIG. 7, shown is a flow diagram of an algorithm for a connections progress engine in accordance with one embodiment of the present invention. As shown in FIG. 7, method 700 may provide a loop that is performed for each fabric present in a system. Process 700 may begin at block 710, where for each fabric a loop may be entered. At diamond 720, it may be determined whether the variables nConnectionsInProgress or nConnectionsMaybeExpected are not equal to zero. If so, control passes to block 730, where the connections over the current fabric may be checked. Then at diamond 740, it may be determined whether a new connection has been established through the VC. If so, control passes to block 745 where the VC may be added to the list of connections for the current fabric and the variables nConnections [fabric] and nConnectionsInProgress may be incremented and decremented, respectively. More specifically, for a particular fabric, the VC is placed into a queue connected that contains all connected VC for this fabric, sorted by increasing process rank. Then at block 750, control passes back from the progress engine with a correction of the FairConnectionsSpinCount and FairReadsSpinCount variables.

Still referring to FIG. 7, if at diamond 740 it is instead determined that there is no new connection established through a VC, control passes to diamond 760 to determine whether other fabrics are present that have not been processed. If so, control passes to block 765 of the next fabric and back to the loop beginning at block 710. Otherwise, the connections progress engine may conclude. While shown with this particular implementation in the embodiment of FIG. 7, the scope of the present invention is not limited in this regard.

Thus as shown in FIGS. 3 and 4, connection establishment can be initiated either by a send request on the sender side, or by a receive request on the receiver side with a defined source rank, or by receipt of a corresponding control package initiating the receive operation on the receiver side. After initialization of the connection transaction in any of these cases, a global variable nConnectionsInProgress is incremented. Note further that this variable can be decremented whenever a connection is established, as shown in FIG. 7.

The aforementioned variables and, in the case of certain optimizations the aforementioned queues, are used by the progress engine for querying the fabrics for data transfer and connections requests. In particular, the connection requests are only queried if the value of at least one of the global variables nConnectionsInProgress and nConnectionsMaybeExpected is not equal to zero, as shown in FIG. 7. Further, the read requests for the VC are only queried if the value of at least one of the variables nReadsAreExpected and VCNumberReadsInProgress is not equal to zero, as shown in FIG. 6. If nReadsAreExpected is equal to zero, the read progress is executed according to the contents of the queue of expected reads that contains the VC with a non-zero VCNumberReadsInProgress, and write progress is called only if the nWritesInProgress variable for this fabric is not equal to zero, as shown in FIG. 6.

Note that in the absence of the various send or read requests discussed above, when a passive side of a connection has no chance to learn about the connection request or about the message to be received, the use of the FairConnectionsSpinCount and FairReadsSpinCount prevents a deadlock. These variables are set to certain initial values and are decremented on every iteration of the progress engine. As soon as one of these values becomes equal to zero, the corresponding variable nConnectionsMaybeExpected or nReadsAreExpected is incremented, and the respective spin count variable is reset to its initial value, as described above in FIG. 5. In effect, this enforces periodic querying of all fabrics and virtual channels for possibly outstanding connection and data transfer requests.

Since large values of the spin count variables may delay connection establishment, while small values may decrease the effect of the optimizations described above, the initial values of the spin count variables can be controlled by the user via specific environment variables.

In addition, the spin count variables may be temporarily manipulated by the MPI implementation itself. For example, to optimize performance of certain collective operations it may be beneficial to set all spin counts to their maximum value, thus effectively preventing processing of any stray connection and data transfer requests happening outside of an already established communication pattern. These values may be reset to the original values when the desired temporary effect is achieved.

Embodiments thus automatically reduce overhead associated with connection establishment and data transfer requests. Further, various precautionary measures, user control, and temporary library control may be provided over the optimization mechanisms. In this way, very good out-of-the-box performance can be combined with the ability to fine tune it for the needs of particular applications. Embodiments may thus increase performance of collective operations systematically. For example, in the case of 64 nodes, performance of 256 processes can be improved by about 40%, and for 128 nodes, 512 processes can be improved from 20% to 2.5 times, depending on the workload. Moreover, overall performance of collective operations for 128 nodes, 512 processes may be improved by 1.5-2.5 times, and for 256 nodes, 1024 processes by 4-7 times.

Embodiments thus provide a comprehensive approach to minimizing the overheads associated with connection establishment and data transfer operations in a multifabric MPI implementation. This approach combines: automatic determination of the minimum necessary subset of the fabrics and virtual channels necessary for execution of all currently available connection and data transfer requests; efficient, almost lossless processing of MPI_ANY_SOURCE receive requests and other comparable situations in which the source process is unknown; and temporary optimizing of certain collective operations through the prevention of unnecessary processing of spurious connection and data transfer requests outside of an established communication pattern.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
a first node including at least one multi-core processor having a plurality of cores, wherein each core can execute a process; and
a memory coupled to the at least one multi-core processor, wherein the memory includes instructions that enable the system to automatically determine a minimum number of fabrics and virtual channels to be activated to handle pending connection requests and data transfer requests, to prevent processing of new connection requests and data transfer requests outside of a predetermined communication pattern, and to update a count of expected connections when a first spin count to control activity of a progress engine reaches a predetermined value, to thereafter set the first spin count to an initial value, update a count of expected reads when a second spin count to control activity of the progress engine reaches the predetermined value, and thereafter set the second spin count to the initial value, and to cause the first spin count and the second spin count to be set to a maximum value to reduce querying of the first and second fabrics and associated virtual channels.

2. The system of claim 1, wherein the first node is coupled to a second node by a first fabric and coupled to a third node by a second fabric, wherein the first and second fabrics are heterogeneous.

3. The system of claim 1, further comprising instructions to cause a progress engine to query a plurality of fabrics and virtual channels of the new connection requests and the data transfer requests based at least in part on at least one of the count of expected connections and the count of expected reads.

4. A method comprising:
automatically determining a minimum number of fabrics and virtual channels of a multi-node computing system including a first node coupled to a second node via a first fabric, and coupled to a third node via a second fabric heterogeneous to the first fabric, each of the first, second and third nodes including a multi-core processor, the minimum number of fabrics and virtual channels to be activated to handle pending connection requests and data transfer requests;
preventing processing of new connection requests and data transfer requests outside of a predetermined communication pattern;
updating a count of expected connections when a first spin count associated with a progress engine reaches a first predetermined value, and thereafter setting the first spin count to a first initial value;
updating a count of expected reads when a second spin count associated with the progress engine reaches a second predetermined value, and thereafter setting the second spin count to a second initial value; and
causing the first spin count and the second spin count to be set to a maximum value to reduce querying of the first and second fabrics and associated virtual channels.

5. The method of claim 4, further comprising causing the progress engine to query a plurality of fabrics and virtual channels for the new connection requests and the data transfer requests based at least in part on at least one of the count of expected connections and the count of expected reads.

6. The method of claim 5, further comprising enforcing periodic querying of the plurality of fabrics and virtual channels for possible outstanding connection and data transfer requests.

7. The method of claim 6, further comprising enforcing the periodic querying via the first and second spin counts.

8. The method of claim 4, further comprising temporarily setting the first spin count and the second spin count each to a predetermined maximum level and thereafter performing a collective operation.

9. An article comprising a non-transitory machine-accessible storage medium including instructions that when executed cause a system to:
automatically determine a minimum number of fabrics and virtual channels of a multi-node computing system including a first node coupled to a second node via a first fabric, and coupled to a third node via a second fabric heterogeneous to the first fabric, each of the first, second and third nodes including a multi-core processor, the minimum number of fabrics and virtual channels to be activated to handle pending connection requests and data transfer requests, and prevent processing of new connection requests and data transfer requests outside of a predetermined communication pattern;
update a count of expected connections when a first spin count associated with a progress engine reaches a first predetermined value, and thereafter set the first spin count to an initial value;
update a count of expected reads when a second spin count associated with the progress engine reaches a second predetermined value, and thereafter set the second spin count to the initial value; and
cause the first spin count and the second spin count to be set to a maximum value to reduce querying of the first and second fabrics and associated virtual channels.

10. The article of claim 9, further comprising instructions that when executed enable the system to cause the progress engine to query a plurality of fabrics and virtual channels for the new connection requests and the data transfer requests based at least in part on at least one of the count of expected connections and the count of expected reads.

11. The article of claim 10, further comprising instructions that when executed enable the system to enforce periodic querying of the plurality of fabrics and virtual channels for possible outstanding connection and data transfer requests.

12. The article of claim 9, further comprising instructions that when executed enable the system to temporarily set the first spin count and the second spin count each to a predetermined maximum level and thereafter perform a collective operation and set the first spin count and the second spin count each to an original value.

* * * * *